WITNESSES:
Robert C. Baird
Leon M. Garman

INVENTOR
Marvin H. Cunningham.
BY
Frederick Shapoe
ATTORNEY

Nov. 29, 1955 M. H. CUNNINGHAM 2,725,271

UNITARY THERMALLY INSULATING STRUCTURAL MEMBERS

Filed May 2, 1952 7 Sheets-Sheet 2

WITNESSES:
Robert C. Baird
Leon M. Garman

INVENTOR
Marvin H. Cunningham.
BY
Frederick Shapoe
ATTORNEY

WITNESSES:
Robert C. Baird.
Leon M. Garman

INVENTOR
Marvin H. Cunningham.
BY
Frederick Shapoe
ATTORNEY

UNITARY THERMALLY INSULATING STRUCTURAL MEMBERS

WITNESSES:
Robert C. Baird
Leon M. Garman

INVENTOR
Marvin H. Cunningham.
BY
Frederick Shapoe
ATTORNEY

Nov. 29, 1955 M. H. CUNNINGHAM 2,725,271

UNITARY THERMALLY INSULATING STRUCTURAL MEMBERS

Filed May 2, 1952 7 Sheets-Sheet 5

WITNESSES:
Robert C. Baird
Leon M. Garman

INVENTOR
Marvin H. Cunningham.
BY
Frederick Shapoe
ATTORNEY

WITNESSES:
Robert C. Baird
Leon M. Gorman

INVENTOR
Marvin H. Cunningham.
BY
Frederick Shapoe
ATTORNEY

UNITARY THERMALLY INSULATING STRUCTURAL MEMBERS

Filed May 2, 1952 7 Sheets-Sheet 7

WITNESSES:
Robert C. Baird
Leon M. Garman

INVENTOR
Marvin H. Cunningham.
BY
Frederick Shapoe
ATTORNEY

United States Patent Office 2,725,271

Patented Nov. 29, 1955

2,725,271

UNITARY THERMALLY INSULATING STRUCTURAL MEMBERS

Marvin H. Cunningham, Circleville, Ohio, assignor to Westinghouse Electric Corporation, East Pittsburgh, Pa., a corporation of Pennsylvania Application May 2, 1952, Serial No. 285,691

19 Claims. (Cl. 312—214)

This invention relates to unitary thermally insulating structural members, suitable for refrigerators and the like, comprising an interior of fibrous insulation and an exterior shell of resinous material integrally united to the fibrous material.

This application is a continuation-in-part of my copending application Serial No. 146,223, filed February 25, 1950, now abandoned.

Heretofore, in preparing thermally insulated structures such, for example, as refrigerators, the members have been prepared from steel sheets, bars, and the like, assembled to form the exterior and interior walls of the refrigerator with hollow spaces therein and thereafter insulating materials, such as glass wool, balsam wool, or the like, have been packed into the hollow spaces to provide the insulation. Apart from the extensive manual operations required, the prior art construction was inherently costly and required considerable machining and assembling to produce a satisfactory refrigerator. Those skilled in the art are well aware of the numerous shortcomings of such prior art practice, particularly with regard to the large amount of labor required and consequent relatively high cost.

The object of the present invention is to provide unitary structural members wherein the members serve to support loads and have thermally insulating properties.

A further object of the invention is to provide unitary thermally insulating members having a desired shape, size and finish, which members are suitable for supporting loads.

A still further object of the invention is to provide a refrigerator wherein the structure is comprised of a formed body of fibrous insulation and an exterior of resinous material integrally united therewith.

Another object is to provide a unitary thermally insulating material of predetermined shape, size and surface finish comprising a unitary body of fibrous insulation, solid frame members disposed within the body, and a resinous shell formed about the body with projections from the frame passing through the resinous shell.

An additional object is to provide a process for treating bodies of fibrous insulating materials with successive, reinforcing layers and coatings of resinous materials to produce unitary, load bearing, thermally insulating members of predetermined size, shape and surface appearance.

Other objects of the invention will, in part, be obvious, and will, in part, appear hereinafter.

For a better understanding of the nature and advantages of the invention, reference should be had to the following detailed description and drawing, in which.

Figure 1:
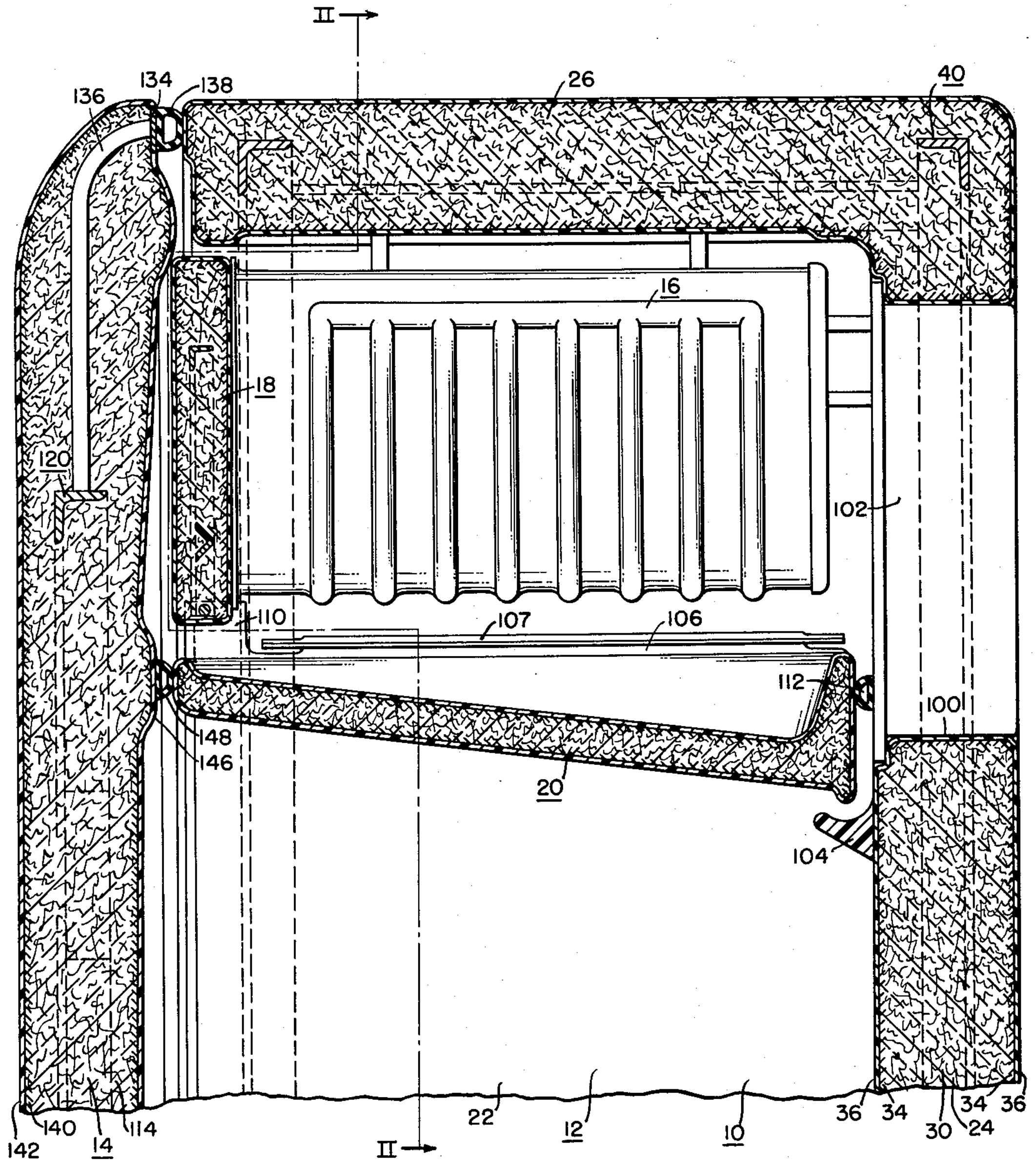
Figure 1 is a side elevation, partly in section, of a portion of a refrigerator cabinet constructed in accordance with the invention.

Briefly, my invention comprises the preparation of load bearing and thermally insulating unitary members by treating a formed body of matted fibrous material with a series of impregnating layers and coatings of resinous materials to produce an integral resinous shell about the entire exterior of the body firmly impregnated into and united with the fibers at the surface only of the formed body, the major volume of the body comprising unimpregnated fibers and the resin being so applied that the completed member is rigid and has a predetermined shape, size and surface finish. The members may comprise exclusively a body of glass fibers and the applied integral resinous shell or they comprise a framework of metal, plastic, or the like, disposed within the body of fibrous material with portions of the framework extending through and affixed to the resinous shell to serve for attachment to other members and for load bearing purposes.

More specifically, in practicing the invention, a body of matted fibrous material having thermally insulating properties is prepared from any suitable fibrous material. Glass fibers, rock or mineral wool, asbestos fibers, fibers of synthetic resins such as nylon, balsam wool or mixtures may be employed. For the purpose of this invention, it is preferable to employ bodies comprising inorganic fibrous material and in particular glass or rock wool, with or without asbestos fibers. In these bodies the fibers are heterogenously disposed, though some slight orientation will be often exhibited in the longitudinal direction of a batt thereof.

The matted fibrous material is treated with a small amount of a binder to unite the fibers into a firm body or batt that may be cut or otherwise formed into a predetermined shape. The resin is usually applied at the time the fibers are being assembled into a batt or body. Numerous resins may be employed for treating the fibers. In particular, phenolic resins and vinyl polymers such as polystyrene or polyvinyl chloride may be applied to the glass fibers. These resins are only exemplary and numerous others are known and have been used in the art. The resinous binder ordinarily weighs a small fraction (about 2% to 15%) of the weight of the inorganic fibers. An example of a typical material comprises a body or batt of glass fibers having an average fiber diameter of 0.00006 inch. The weight of the resin treated inorganic fibrous body will be from 1.5 to 12 pounds per cubic foot, depending upon the degree of compaction of the glass fibers and the amount of applied resin. The thermal conductivity of such as glass batt or body with applied binder will vary from 0.22 to 0.28 B. t. u. per square foot per hour per degree Fahrenheit per inch thickness.

In the prior practices of the industry, batts of inorganic fibrous materials have been employed to fill cavities in walls of refrigerator cabinets, freezers, and the like without any further treatment. It has also been proposed to apply a surface coating of some asphaltic material to the batts in order to produce a more rigid member that may be handled without falling apart and that may be disposed between building supports or the like. In no case were the treatments such as to produce a load supporting member having a smooth, formed surface that closely approached some selected shape and size.

In accordance with the present invention, the fibrous material with the binder applied thereto to render it relatively firm is cut, sawed, machined or otherwise shaped to substantially the size of the structural member ultimately desired. This formed body may be substantially close to the desired shape and size of the member, or it may be slightly less, but not exceeding about one-quarter inch smaller in any dimension. Ordinarily the thickness of the shaped body will be at least three-quarters of an inch, and usually will be from 1½ to 2 inches. In some instances small portions may be about one-half inch thick. For some purposes batts from 1 to 1½ inches thick may be superimposed forming a body of any suitable thickness.

Thereafter, an initial penetrating layer of organic resin is applied by spraying, dipping, flushing or otherwise to the entire outer surface of the formed body of fibrous material to impregnate it to a depth of the order of 0.125 inch and not exceeding about one-fourth inch in depth. It is necessary that a substantial thickness of organic resin be applied to the entire exterior surface of the body of fibrous material in order to provide for adequate load bearing properties. On the other hand, an excessive thickness of impregnating resin will impair the thermal insulation properties and will produce no corresponding benefit. For lightly loaded members, the impregnating layer may average from 1/25 inch to 1/16 inch in thickness.

The organic resin employed for the impregnating is one that will cure into a hard adherent layer thereby providing an integral resinous shell about the entire surface of the formed body of fibrous material. The applied layer of resin is preferably cured by heating or baking.

After curing of the applied layer of penetrating resin, there results an extremely rough surfaced member that is not particularly suitable for use. Numerous glass fibers will project through the surface of the resin and many irregularities such as cavities or depressions and projections will be present at the surface. As the succeeding step, the surface of the resulting member is abraded by sanding or filing or otherwise mechanically treated to remove the projecting fibers and, if necessary, to remove or to smooth off any excessive projections. A second light application or spotting of openings, cavities or depressions with more impregnating resin may be required after the abrading treatment. It will be appreciated that more than one penetrating layer of resin may be applied though it has been found that a properly applied single layer of resin of the order of 0.125 inch thickness is ordinarily adequate.

After abrading the surface of the member with the applied cured penetrating layer of resin thereon, it is coated with a fairly heavy coating of a self-leveling curable organic resin applied to produce a much smoother surface to bring the member more nearly to substantially the ultimate desired shape and size. Priming surface finishes are particularly suitable for this purpose. They may be applied by known procedures, such as spraying, brushing, or dipping, to apply a proper amount to produce the desired thickness and type of coating. The applied primer coating of resin is cured, preferably by heat treating, partly or completely, and then, if necessary, sanded or otherwise finished to bring the member more closely to desired finish and form. If required, the member may be entirely recoated with the primer finish or only retouched, and the additional application of primer cured and sanded.

After the priming surface coating has been so sanded and fully cured, at least one coating of a surface finish comprising a curable organic resin is then applied to bring the surface to desired smoothness. The finish coating is then cured, as by baking, thereby resulting in the desired member.

The resulting member will comprise a unitary structure of surprising rigidity and strength. The shape and finish will be acceptable for nearly all commercial uses. In this member, the major part of the volume consists of a central body of insulating inorganic fibrous material with its small amount of applied binder. A minor proportion of the volume of the member comprises a resinous shell of which the greater part is combined with the fibrous material at the surface of the body of fibrous material and adherently bonded to the fibers.

As a modification, there may be disposed throughout the body of fibrous material frame members composed of resinous laminates, wood metal, or the like, ordinarily having projections passing through the exterior resinous shell and affixed to the exterior resinous shell. These projections may be used for attaching to other members as by hinging, bolting, and so forth. Otherwise the members are identical with those having no frame members.

For a more specific description of the nature of the present invention, reference should be had to the figures of the drawings, which are specific to a refrigerator constructed in accordance therewith. Referring to Fig. 1 of the drawing, there is shown a portion of a refrigerator 10 comprising a cabinet 12, a door 14, a cooling evaporator 16 disposed within a freezing compartment proper, to which access is had through an evaporator door 18, and a tray 20 defining the lower wall of the freezing compartment which tray also serves as a water collecting and disposing member. Each of the members 12, 14, 18 and 20 are of the unitary construction of this invention and obviously they bear substantial loads. Each member is characterized by good thermal insulation properties.

Figure 2:
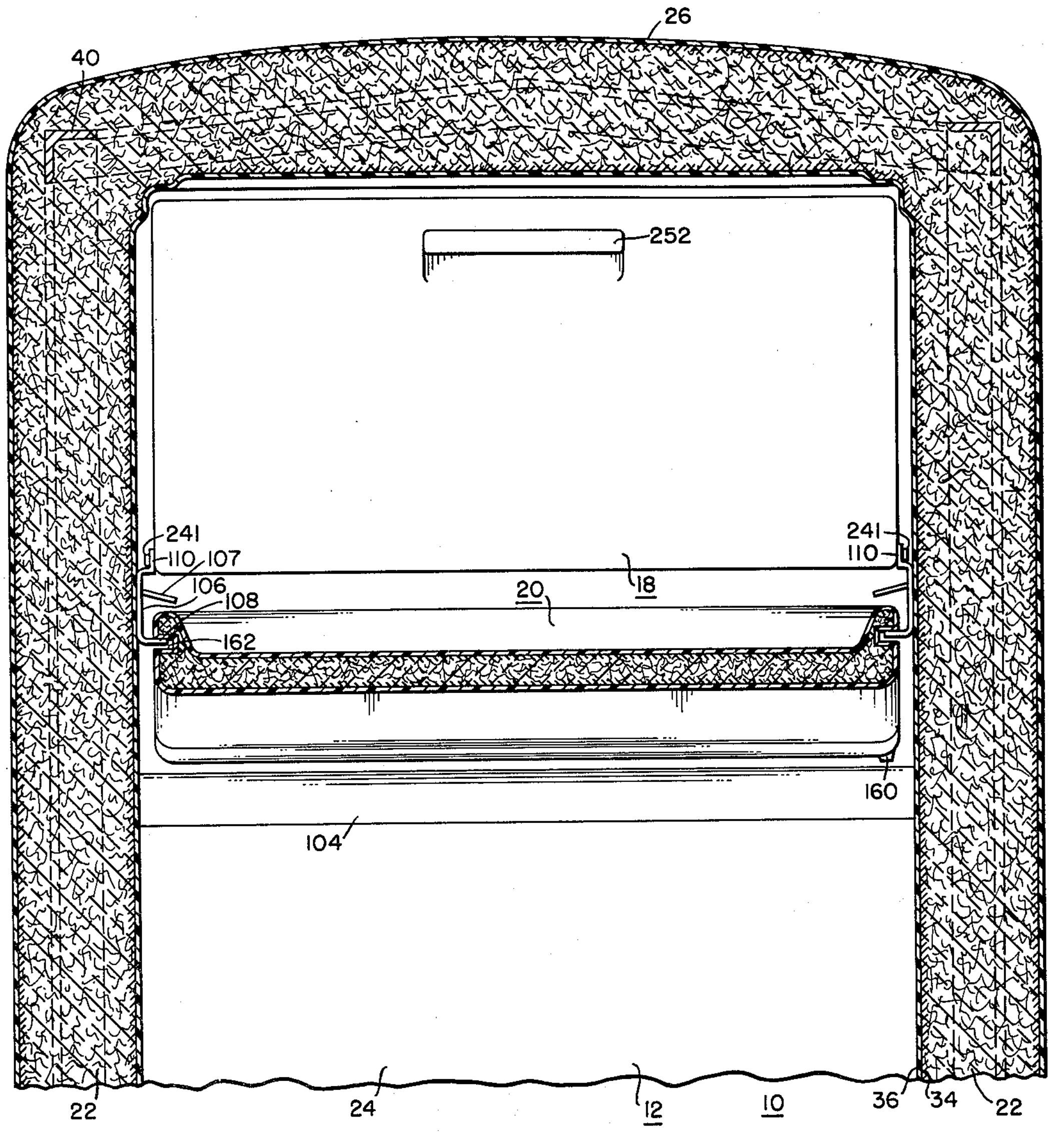
Fig. 2 is a front elevation of the same cabinet taken on line II—II of Fig. 1.

Referring to Figs. 1 and 2, the refrigerator cabinet 12 comprises side walls 22, a back wall 24 and a top wall 26, al of integral, unitary construction. The cabinet 12 comprises a unitary body 30 of glass fibers carrying a small amount of applied binder, formed closely to the desired exterior and interior shape of the walls 22, 24 and 26 as illustrated. The entire exterior surface of the fibrous body 30 of inorganic fibrous material is treated with a penetrating layer 34 of cured organic resin associated with a suitable number of cured primer and finish coatings 36 of cured organic resin to provide the required shape and finish to the cabinet. Disposed within the body 30 of fibrous material is a framework 40 to provide the requisite strength for service.

Figure 3:
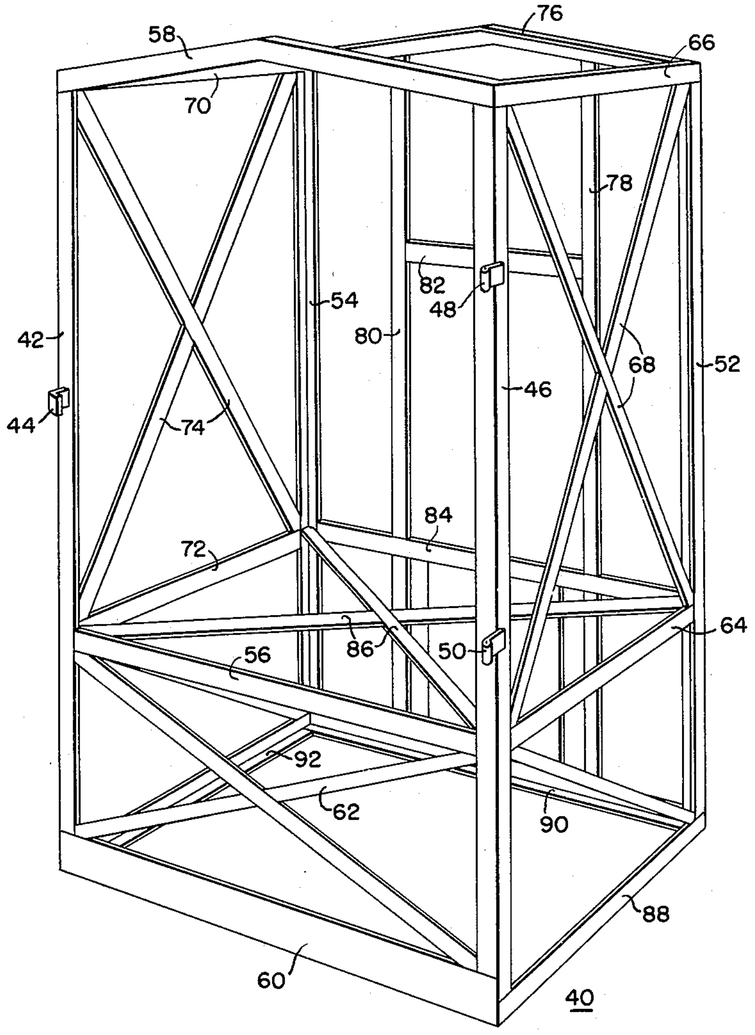
Fig. 3 is a view in perspective of a metal framework of a refrigerator cabinet.

Referring to Fig. 3 of the drawing, there is shown in detail one suitable framework 40, made of steel, for example, for the refrigerator cabinet 12. The framework comprises a left front vertical support 42 to which is fastened a catch 44 for a door latch, a right front vertical support 46 provided with two hinge members 48 and 50, and two rear vertical supports 52 and 54. The top and bottom of the opening to the refrigerator cabinet is defined by front horizontal frame members 56 and 58 affixed to the vertical members 42 and 46, the latter defining the sides of the opening. An additional cross member 60 is disposed at the bottom of the vertical supports 42 and 46 along with two diagonal cross braces 62. Between the vertical supports 46 and 52 are disposed horizontal braces 64 and 66 as well as the diagonal bracing 68. Similarly, between vertical supports 42 and 54 are horizontal braces 70 and 72 and diagonal bracing 74. At the back is a top brace 76 to which are fastened the upper ends of vertical supports 78 and 80 on which a refrigerating unit may be supported, with a cross bar 82 defining an opening between the supports, above which bar 82 the evaporator unit 16 may be introduced into the refrigerating compartment.

An intermediate cross brace 84 is disposed between the vertical supports 52, 54, 78 and 80. Diagonal bracing members 86 may be placed to tie in the vertical supports 42, 46, 52 and 54 and to define the bottom of the refrigerating compartment proper. The space below the braces 86 will receive the compressor and condenser of a refrigerating unit (not shown). If desired, cross braces 88, 90, 92 may be placed around the sides and back to join the bottom ends of the vertical supports. The frame members shown in Fig. 3 may be united by welding, riveting or other suitable fastening means into a strong unitary framework 40. It will be understood that the members in Figure 3 may be of a reinforced phenolic laminate or other material. In some cases the diagonal bracing 62, 86, 68 and 74 may be dispensed with.

Preformed batts or bodies of inorganic fibrous material, such as glass fiber, may be placed about the framework 40 as to provide on the order of one inch thickness thereof on both sides of the various members thereof. The batts or preformed bodies may be secured to the frame members by tying with cord or wire, or the like at various points. The framework 40 may be coated with adhesive and the fibrous material thereby attached in position. When so applied, the only portions of the framework that will be visible are the catch member 44 and the hinge members 48 and 50, and if desired, the bottom surfaces of the members 60, 88, 90 and 92. Between the supports 42 and 46 and the frame members 56 and 58 will be the door opening to the refrigerating compartment. The space above cross bar 82 between supports 78 and 80 also will be open, as will be the space below the cross brace 84, so that the evaporator and compressor of the refrigerating unit may be fitted into the refrigerator cabinet.

Thereafter, the entire glass fiber body 30 with its enclosed framework 40 may be dipped in a body of organic resin or sprayed on all its surfaces with a penetrating resin to a depth of the order of 0.125 inch thereto. Good results may be obtained by applying an organosol, particularly by spraying.

A suitable organosol comprises a dispersion of a vinyl polymer in a dispersing medium. Such vinyl polymer organosols may comprise a vinyl chloride-vinyl acetate copolymer (19 to 1 mol ratio of vinyl chloride to vinyl acetate) having a molecular weight of about 10,000 to 15,000 dispersed in a dispersant comprising a mixture of diisobutyl ketone (20%) and xylene (80%), the dispersant forming 65% of the organosol. A plasticizer, such as dioctyl phthalate in an amount equal to 10% of the vinyl polymer, may be present in such dispersion. A dispersion comprising 50% of the vinyl copolymer and 50% by weight of dioctyl phthalate, without a volatile solvent, may be applied. When sprayed on the glass fiber body, the organosol will penetrate therein only a short distance and will adhere to the glass fibers. A heavy penetrating layer of such organosol may be cured into a tough, hard resin by baking to a temperature of from 350° F. to 400° F. for a brief period of time—5 to 15 minutes being adequate. Thereafter the entire surface of the cabinet may be sanded as by hand or by mechanical sanders to remove projecting glass fibers and to cut down any excess projections. A light second coating of the organosol may be applied after the baking operation to fill in any depressions and to build up a uniform layer of the order of 0.125 inch thickness.

Thereafter, a primer type of coating is applied to the sanded refrigerator cabinet. This primer coating is applied as a fairly thick coating. Such coating compositions are well known in the art and they comprise substantial qualities of pigments and organic resins. Coatings of primer compositions tend to level out and form a smooth sealing surface over the initial layer of impregnated material.

As an example, a primer coating may comprise 100 parts by weight of a linseed oil modified glycerol phthalate resin, 60 parts by weight of a finely ground filler comprising 80% by weight of whiting and 20% of mica dust, and 50 parts by weight of a vinyl chloride-vinyl acetate copolymer of a molecular weight of 15,000. An aromatic solvent such as xylol, alone, or admixed with an ester, such as butyl acetate, or an alcohol, such as ethanol, or a ketone, such as ethyl ketone, may be employed to produe a solution from the resinous primer ingredients.

Baking of the applied primer coating at a temperature of from 300° F. to 375° F. for about 10 minutes will partly cure the primer coat to produce a hard coating which will resist chipping and will be firmly and adherently bonded to the relatively rough impregnating layer previously described. All of the exposed surfaces of the resulting cabinet may be sanded smooth. After sanding, the primer coating may be further cured by heating for an additional period of time of from 10 to 30 minutes at from 300° F. to 350° F. In case the primer coating has sanded through at any portion, this portion may be coated with additional coating of the primer composition and these spots again treated by baking to a partial cure followed by light sanding and then the retreated cabinet is fully cured by baking. This will result in a fairly smooth, uniform appearing cabinet.

After the primer coating has been fully baked, a finish coat of resin may be applied to give a desirable surface smoothness and gloss to the refrigerator cabinet. The finish coating may comprise any one of well known organic finishes applied to refrigerator structures as at present produced. Thus, a coating of an enamel comprising urea-formaldehyde resin admixed with a glycerol phthalate resin, or a melamine resin combined with an alkyd resin, or a polyvinyl resin, each dissolved in a solvent and containing a relatively large amount of pigment such as titanium dioxide, may be sprayed over the entire surface and the finish coating baked at temperatures of from 250° F. to 400° F. for from 15 to 45 minutes. In some cases, additional costs of organic finish may be applied to secure the desired smoothness and gloss, sanding being employed between coats.

The resulting refrigerator cabinet will be smooth, rigid and extremely durable. It will be light due to the small amount of heavy structural materials employed for the framework. Inasmuch as substantially no metal is exposed, entry of heat and vibration are greatly minimized as compared to cabinets prepared from steel sheets attached to metal frame parts. There is avoided the necessity for employing so-called "breaker strips" in order to prevent conduction of heat from the exterior to the interior of the refrigerator compartment as is required with exposed metal structures. The resulting cabinet is an integral, single-piece member.

It will be appreciated that numerous penetrating and coating resinous compositions may be employed, other than the ones mentioned. Examples of suitable resinous compositions are:

(1) The cellulose esters and ethers, for instance, cellulose acetate butyrate and ethyl cellulose. These are particularly advantageous for the initial impregnating layer;

(2) Phenolic resins, for example, phenol formaldehyde, tung oil modified phenol formaldehyde, phenol-furfural and resorcinol-aldehyde resins;

(3) Polyepoxy resins, for instance, the reaction product of bisphenol and epichlorhydrin, as disclosed in Patent 2,444,333, and modifications thereof with phenolic resins, melamine resins or urea resins or with organic acids, both monocarboxylic and polycarboxylic, as disclosed in Patents 2,456,408 and 2,324,483;

(4) Urea-formaldehyde and urea-formaldehyde-butanol resins;

(5) Melamine formaldehyde resins;

(6) Alkyd resins, for example, glycerol phthalates, glycol maleates, pentaerythritol phthalates, and oil modified derivatives thereof, particularly linseed oil and other drying oil modified polyhydric alcohol maleates and phthalates; and (7) Vinyl polymers including vinyl acetate resins, vinyl chloride resins, vinyl acetate-vinyl chloride copolymers, vinylidene chloride polymers and polyvinyl acetals.

It will be appreciated that mixtures of any two or more of the above may be employed if desired.

For coating purposes, the resins are dissolved or dispersed in suitable solvents or dispersants or otherwise reduced to sufficiently fluid form for application to the formed body or inorganic body of fibrous material. The use of fillers, such as asbestine, whiting and barium sulfate, plasticizers, dyes and pigments, such as zinc oxide, titanium dioxide, iron oxide and lead chromate, in accordance with conventional practice is well known and need not be detailed herein.

As illustrated in Figs. 1 and 2, the resulting unitary cabinet 12 contains an opening 100 through which the evaporator unit 16 is introduced. This opening is closed with an insulating plug 102 prepared in a manner similar to the cabinet, that is, from a body of fibrous material treated with a layer of penetrating resin and coatings of primer and finish.

A gutter strip 104 either of a plastic or metal may be cemented to the cabinet rear wall 24 to catch and vent any water which may result from defrosting of the evaporator unit 16.

Along both of the side walls 22 of the refrigerator are located combined guides, drip strips and supporting members 106 of metal, for example. Each of the members 106 comprises a drip strip 107 to direct defrost water into drip tray 20, and a flange 108 on which an insulating drip tray 20 may be mounted for slidable movement. The members 106 each include a bracket 110 to which hinge pins 240 of the door 18 to the freezer and evaporator compartment are fitted. The members 106 may be fastened to the side walls 22 of the refrigerating cabinet by an adhesive, screws, or suitable fastening means or, if desired, they may be carried by the evaporator unit 16. The slidable tray 20 abuts at its rear end against a gasket 112 in order to seal the evaporator compartment from the lower portion of the refrigeration compartment.

The door 14 for the refrigerator comprises a unitary, thermally insulating structure constructed much as is the insulating cabinet 12. It comprises a formed body of fibrous material 114 treated with a small amount of resinous binder to enable the body to hold its shape. Disposed within the body 114 of fibrous material is a frame member 120 composed of metal or plastic, or the like. The frame member comprises hinge and latch portions.

Figure 4:
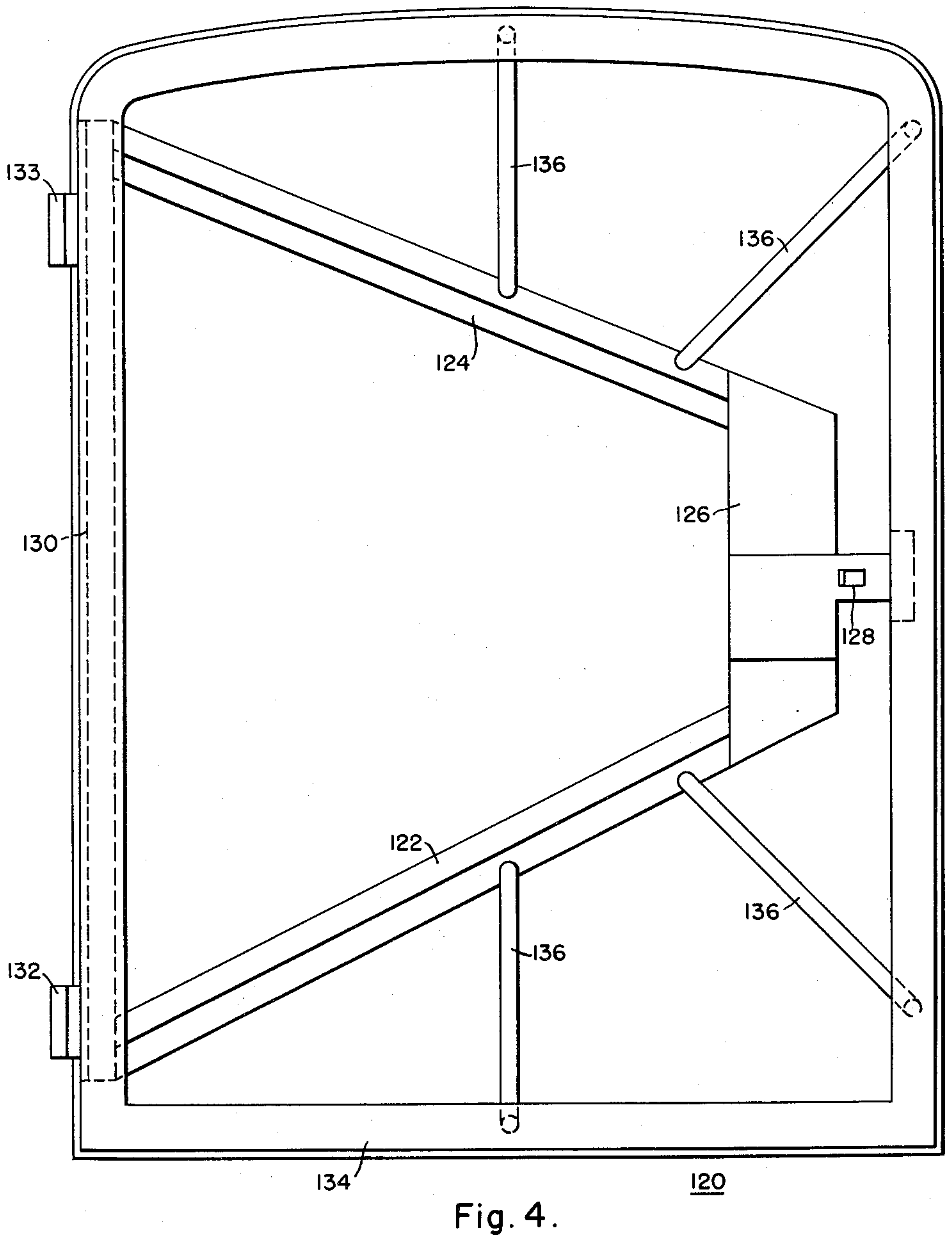
Fig. 4 is a view in elevation of a metal framework for a refrigerator door.

Referring to Fig. 4 of the drawing, there is illustrated in detail one form of a metal frame member 120 for the door 14. The frame member comprises a generally A-shaped frame having legs 122 and 124 meeting in a cross strip 126 to which is attached a latch mechanism 128. The legs 122 and 124 of the frame are united at their feet by a cross brace 130 to which are fastened hinge members 132 and 133. A number of supporting bars 136 each fastened at one end to the A-frame at their other end carry a peripheral strip 134 to which a door gasket 138 is to be fastened. The strip 134 is provided in order to secure a sufficiently strong and uniform supporting surface to enable the gasket to make a good seal with the cabinet 12. It will be understood, however, that the strip 134 is not absolutely required since the door may be so prepared that the resin shell is sufficiently smooth and uniform to enable the gasket 138 to be satisfactorily mounted thereon.

The metal frame member is embedded in a body of fibrous material 114 so that only the hinges 132 and 133, and a small portion of the latch mechanism, such as the connection to the handle, will project through or be exposed through the fibrous material. The fibrous material may be tied, stitched or wired in a suitable number of places or adhesively attached to frame members 122, 124, 126 and 130 as well as the supports 136. Thereafter, the body of fibrous material with its embedded frame member may be treated with a penetrating layer 140 of organic resin to a depth of the order of 0.125 inch. The layer of penetrating resin is cured and sanded or otherwise treated to remove projecting fibers and excessive projections as previously pointed out with respect to the preparation of the cabinet 12. Thereafter, a coating of primer composition is applied, partly cured, sanded, and then fully cured. One or more finish coats are finally applied to produce a smooth surface coating 142 on the door.

The fully cured finished door may be then provided with peripheral gasket 138 tightly fitting against the opening to the refrigerator compartment. A horizontal ridge 146 may be integrally formed in the inside face of door 14 and a horizontally disposed gasket 148 adhesively fastened thereto to sealably contact the front of the tray 120 thereby completely sealing the part of the compartment around the evaporator from the lower portion of the refrigerator compartment.

Figures 5, 6, 7:
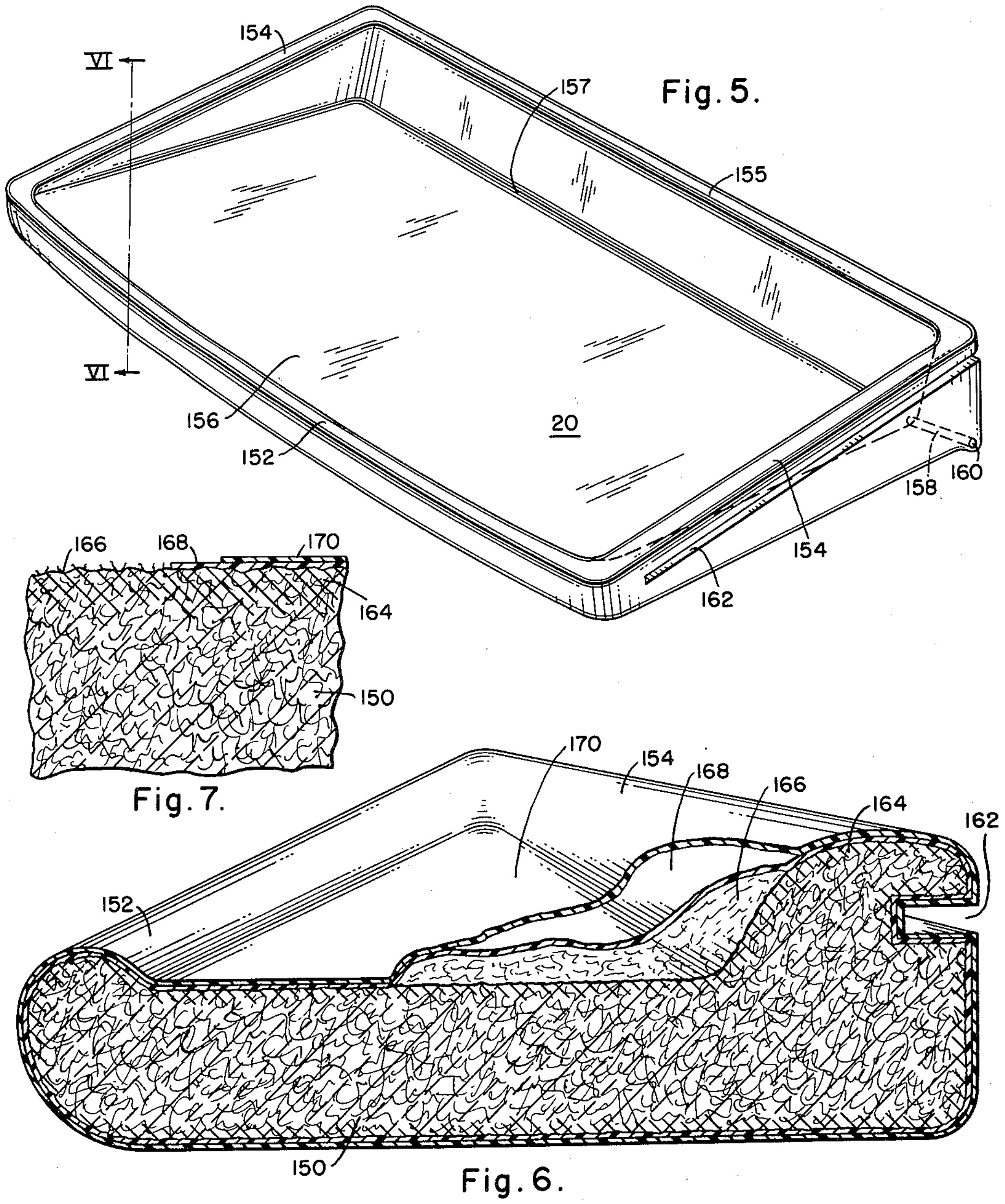
Fig. 5 is a view in perspective of an insulating partition embodying the invention.
Fig. 6 is a sectional view on an enlarged scale taken on line VI—VI of Fig. 5.
Fig. 7 is an enlarged cross section of a portion of the section of Fig. 6.

For a detailed showing of the preparation of a unitary member in accordance with the invention, without any reinforcing frame members therein, reference should be had to Figs. 5, 6 and 7 wherein there is illustrated the construction of the tray 20. The tray 20 comprises a front wall 152, upstanding side walls 154, a rear wall 155, a bottom wall 156 sloping toward the rear wall 155 to form therewith a lower inside edge 157. The edge 157 is inclined downwardly to the right-hand corner at which there is a passage 158 leading to a drain opening 160 which will drain any defrosting water in the tray to the strip 104. Grooves 162 are integrally formed in the tray 20 to allow the tray 20 to be slidably supported on the flanges 108.

As shown in the enlarged sections of Figs. 6 and 7, the entire tray is formed from a single batt or body 150 of fibrous material with a small amount of binder applied thereto to render it firm. Thereafter, the entire exterior surface of the body 150 is treated with a penetrating layer of organic resin 164. After curing of the penetrating layer of resin, it is abraded or sanded to remove protruding fibers and excess of resinous material thereby resulting in a moderately rough surface 166. Thereupon, there is applied to the surface 166 a coating 168 of primer compositions which smooths over the rough surface because of its self-leveling properties. After being cured and sanded as disclosed herein, there is applied over the primer coating 168 one or more finish coatings 170 to produce a tray having the desired surface smoothness and other properties for a satisfactory structural member. This member is waterproof and possesses good thermal insulation properties.

Figure 8:
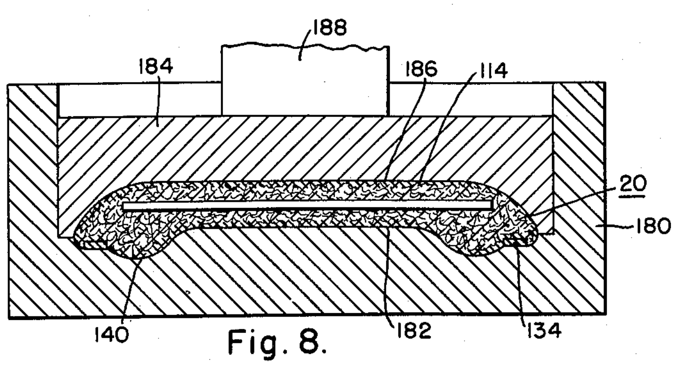
Fig. 8 is a vertical cross section through a mold for producing a door in accordance with the invention.
Figure 9:
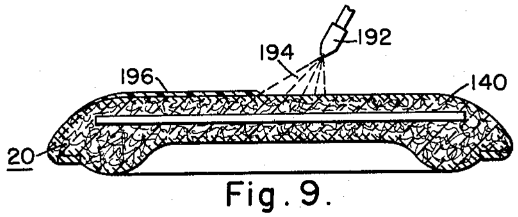
Fig. 9 is a view in cross section.

While it has been emphasized that the unitary members may be prepared by simple dipping or spraying or coating operations, it may be desirable to produce the unitary members in dies or molds in order to secure the utmost accuracy of shape and size. For a detailed example of this modification, reference should be had to Figs. 8 to 11 of the drawing wherein the preparation of a refrigerator door by such methods is shown. In Fig. 8, there is illustrated the molding of the door 20 after a layer of curable impregnating resin has been applied to the entire exterior surface. For this operation, there is employed a two-part mold 180 having a surface 182 corresponding to the desired interior form of the door and a mating die 184 having a surface 186 corresponding to the desired exterior form of the door, the die 184 being driven by a ram 188. The die is heated to a temperature of, for example, 350° F. to 400° F. Before being put in the mold 180, the surface of the glass fiber body 114, is treated with a penetrating layer 140 of a polyester resin, as for instance a propylene glycol-maleate dissolved in from 100% to 40% of its weight of monostyrene and 1.5% by weight of a peroxide catalyst such as benzoyl peroxide. The catalyst proportions may be varied to control the rate of curing. The polyester resin is sprayed over the surfaces of the body 114 in a quantity to provide a layer of between 1/8 inch thickness and 1/16 inch thickness on all of the portions except on the hinge portions and latch portions. The exposed hinge and other projecting portions may be coated with a silicone oil or a polyvinyl acetate composition that can be stripped later. A temperature of 360° F. is sufficient to cure the applied polyester resin in three to four minutes in the mold of Fig. 8. If necessary, a second thin layer of the polyester resin may be sprayed over the door after this treatment and this second coating cured in the mold. The use of the mold 180 and die 184 produces a truer shape with smooth surfaces and eliminates the need for sanding the surfaces.

Figure 10:
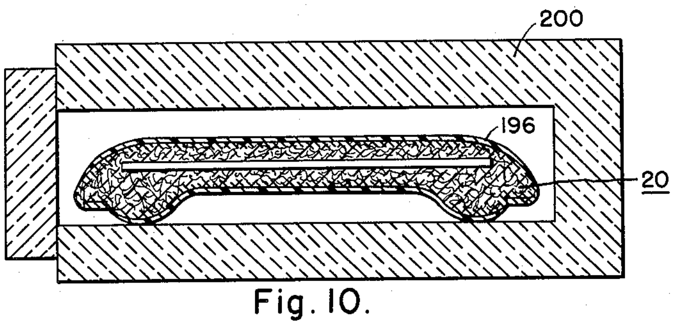
Fig. 10 is a view in cross section of an oven.
Figure 11:
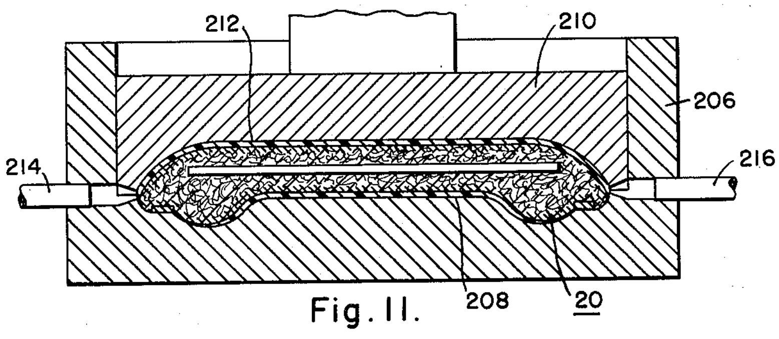
Fig. 11 is a vertical cross section through a die in which doors are molded by injection of resin.

The door 20 with the cured layer of penetrating resin resulting from the mold operation of Fig. 8 is then coated with an additional quantity of the polyester resin through a nozzle 192 which applies a spray 194 of the resin to produce a thin coating 196 over the entire surface of the member. The coated member is then placed in an oven 200 as shown in Fig. 10, where the resin coating may be cured in three to five minutes at temperatures of 350 to 375° F. It is then ready for molding as shown in Figure 11. The coated door 20 is placed in the mold 206 having a bottom cavity 208 of the exact shape, size and surface finish desired for the inside surfaces of the door and closed by a die 210 having a cavity surface 212 to the desired shape, size and finish of the outside surfaces of door 20. The mold 206 is provided with an injection nozzle 214 through which polyester resin admixed with a substantial amount of pigment or dye, or both, may be forced in to fill any space between the door and the surfaces of the mold cavity 208 and 212. A vent 216 is provided to permit the withdrawal of air. The vent 216 is closed after a small amount of the polyester resin flows therethrough.

I have employed the process shown in these Figures 8 to 11 and have produced refrigerator cabinet doors with an excellent surface finish. The dies 206 and 210 are heated to a temperature at which the polyester resin cures in from five to ten minutes. When removed therefrom, the doors will be substantially true and of proper shape and size to function satisfactorily. If desired, an additional coating of enamel or other surface finish may be applied over the molded door to produce a suitable surface appearance.

As an alternative process, the door may be produced in two steps, namely, those shown in Figures 8 and 11 of the drawing, alone being used.

A still further modification of the process is to use the step shown in Figure 8, then apply a primer coating, curing it and sanding, and a final finish coating, these last coatings applied without use of a mold.

It is not necessary to employ injection nozzles 214 as shown in Fig. 11, though I have found this to produce excellent results. As an alternative procedure, in the cavity 208 there may be placed a measured quantity of polyester resin along with the partly treated door. When the die 210 is placed on top of the door and pressed into place, the polyester resin will tend to distribute itself over all of the surface of the door. An aperture (not shown) may be provided at the top of the die to permit excess of resin to bleed off.

In a still further modification of the molding procedure of Figure 11, a tube is introduced through the penetrating layer 140 of resin and when the door 20 has been put in the final finishing die 206—210 with a quantity of the polyester resin, air at a pressure of 10 pounds per square inch, for instance, is introduced into the fibrous interior 114. The internally introduced air pressure enables the entire door to be prepared without the use of any external force or pressure on the die 210. In this last case, molds and dies prepared from resins or plastics or the like may be employed for producing a door.

Figures 12, 13:
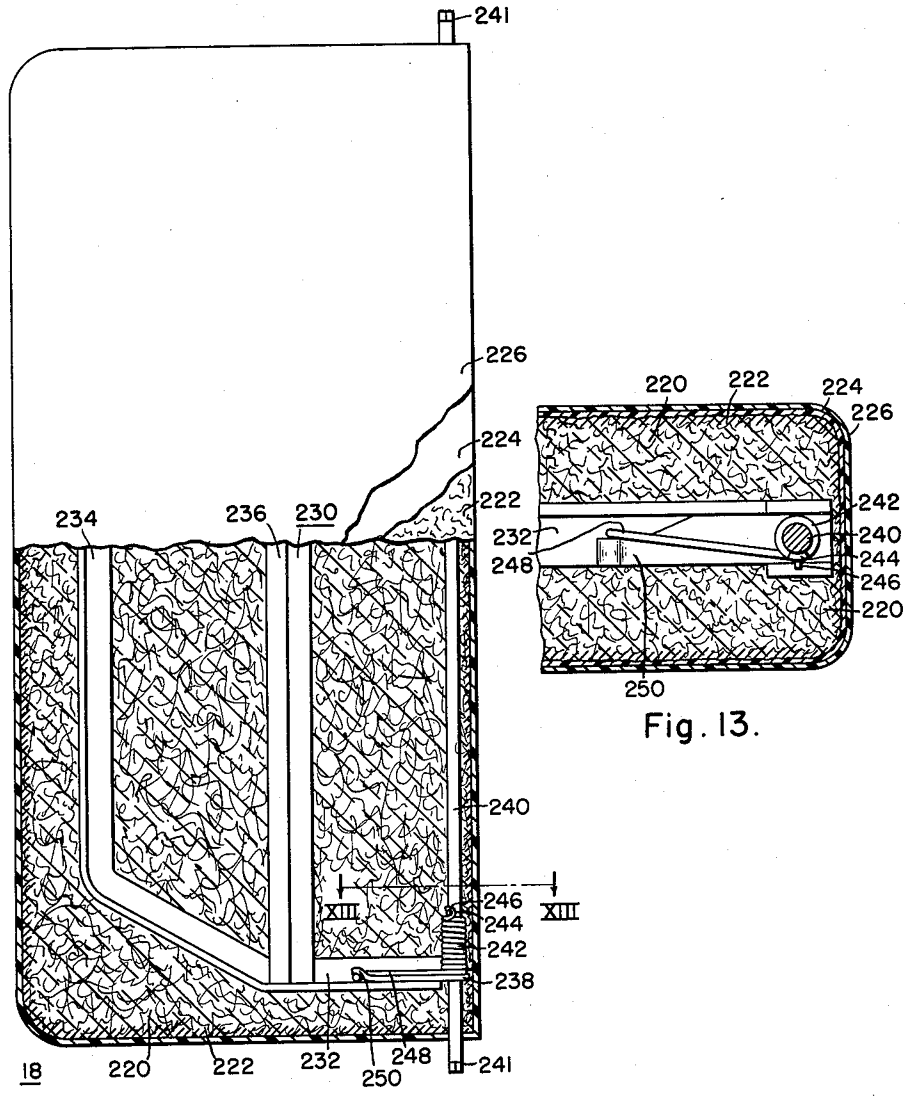
Fig. 12 is a plan view, partly in section, of a freezer door.
Fig. 13 is a cross section, greatly enlarged, along lines XIII—XIII of Fig. 12.

The construction of the freezer compartment door 18 is illustrated in Figs. 12 and 13. This door is prepared by disposing layers of fibrous material 220 on either side of a metal frame 230 of generally A-shape. The fibrous material may be applied in two batts, one on either side of the frame 230, the batts being recessed or cut to accommodate the frame. The body of fibrous material 220 is stitched or tied to the frame member and then treated with a first penetrating layer 222 of resin to produce a strong resinous shell when cured. This cured shell is abraded to remove protruding fibers. Thereafter, a primer coating 224 is applied to seal in the rough surface of the penetrating layer, and is followed by one or more finish coats 226 to produce the desired shape, size and surface finish for the entire door 18.

The frame member 230 comprises angles 232 at either side with a top member 234 and a brace 236 forming, in effect, the bar of the A. A projection 238 on the sides 232 carries a hinge rod 240 provided with squared ends 241 which are affixed to the ends 110 of the member 106. By this means the hinge rod 240 is held nonrotatably whereby the door pivots about the bar on the projections 238. A spring 242 coiled about the bar 240 has one end 244 fastened to a pin 246 integral with the bar while the other end of the spring terminates in an extension 248 which is caught against an upturned portion 250 of the projection 238. The spring 242 functions to rotate the door 18 to closed position. The door 18 may be provided with a handle 252 either molded integrally therewith or a separately prepared handle which is adhesively, or otherwise, fastened thereto, after the body of the door has been prepared.

In producing evaporator doors 18, I have employed glass fiber batts of a density of between 7 and 9 pounds per cubic foot. The freezer doors were light, of pleasing surface appearance and were durable and rigid. They met all the requirements desired of a satisfactory evaporator door.

The following is a further example of the practice of the invention. A shaped body of glass fibers is sprayed with a potentially reactive resorcinol-formaldehyde solution prepared as in Example II of Patent 2,477,641 until the fibers are coated to a depth of 1/8 inch with the composition. After heating for 10 minutes at 150° F., the solvent is evaporated and the applied resorcinol resin is fully cured. The surface of the heat-treated body is rough but light sanding removes projecting fibers. A slurry in water is prepared from 25% by weight of partially reacted, finely powdered urea formaldehyde resin and 75% by weight of plaster of Paris, the slurry being sprayable. The slurry is sprayed over the resorcinol resin treated body to fill in the rough depressions until a relatively smooth surface coating results. The applied coating of slurry hardens in 10 minutes at 150° F. to 210° F. After being hardened, the coating is lightly sanded. A finish coat of a urea-formaldehyde-alkyd resin is sprayed over all the surfaces of the body and cured by baking 20 minutes at 300° F. The resulting member is light, mechanically strong and possesses good surface appearance.

While the present invention has been directed in considerable detail to the preparation of a refrigerator cabinet and associated members, it should be understood that other structures of a similar nature may be prepared in a similar way. It will be understood accordingly that the present description and drawings are only exemplary, not exhaustive.

I claim as my invention:

1. A unitary, thermally insulating member, having a desired shape, size and finish and suitable for use as a load supporting structural member, comprising a body of matted fibrous material, with a small amount of a binder uniting the fibers into a firm body having thermal insulating properties, the body of fibrous material and binder being formed closely to the desired shape of the member, the density of the formed body being from 1.5 to 12 pounds per cubic foot, a penetrating layer of an organic resin applied to the entire exterior surface of the formed body, the layer of organic resin being impregnated into the surface of the formed body to a substantial depth of the order of 0.125 inch but not substantially exceeding 0.25 inch, the layer of organic resin being in a cured, hardened state adhering to the fibers and sealing in the interior of the body to provide a rigid, durable load-bearing resinous shell at the exterior surface of the body, the applied layer having a relatively rough surface, and at least one additional coating of cured, hardened organic resin applied over the entire surface and bonded to the layer of organic resin, the additional coating of cured, hardened organic resin having a smooth surface and bringing the member to desired shape, size and surface finish, the unimpregnated interior of the body of fibrous material constituting the major volumetric portion of the member.

2. The member of claim 1, wherein the organic resins are thermoset synthetic resins.

3. The member of claim 1, wherein two coatings of hardened, cured resin are applied over the layer of organic resin, the first coating being a smooth sanded primer coat, and the second coating being a finish coat to provide for gloss and appearance.

4. The member of claim 3, wherein the two coatings comprise polyvinyl resins.

5. A unitary, thermally insulating load bearing structural member having a predetermined shape, size and surface finish, comprising a body of inorganic fibrous material with a small amount of a binder uniting the fibers into a firm body having thermally insulating properties, the body of fibrous material and binder being formed closely to the shape of the member, the density of the formed body being from 1.5 to 12 pounds per cubic foot, a relatively rigid, solid frame member disposed within the formed body of fibrous material with only a small part of the frame member projecting beyond the surface of the body, the entire exposed surface of the formed body of fibrous material, except for the projecting portions of the frame member being impregnated to a depth of the order of 0.125 inch, but not substantially exceeding 0.25 inch, with a layer of hardened, cured organic resin adhering to the fibers and sealing in the interior in order to provide a rigid, durable resinous load bearing shell at the exterior surface of the body, the interior of the body of inorganic fibrous material being unimpregnated and providing high thermal insulating properties to the member, the layer adherently attached and sealed to the projecting portions of the frame member to cooperate therewith in supporting loads, the impregnating layer having a relatively rough surface, and at least one additional coating of cured, hardened organic resin applied over the entire surface and bonded to the impregnating layer of resin, the additional coating having a smooth surface and bringing the member to desired shape, size and surface finish.

6. A unitary, thermally insulating closure member, comprising a body of inorganic fibrous material with a small amount of a binder uniting the fibers into a firm body having thermally insulating properties, the body of fibrous material and binder being formed closely to the shape of the member, the density of the formed body being from 1.5 to 12 pounds per cubic foot, a relatively rigid, solid frame member disposed within the formed body of fibrous material with only a small part of the portions of the frame member projecting beyond the surface of the formed body, the projecting portions of the frame member being provided with hinging means, the entire exposed surface of the formed body of fibrous material, except for the projecting portions of the frame member, being impregnated to a depth of the order of 0.125 inch, but not substantially exceeding 0.25 inch, with a layer of hardened, cured organic resin adhering to the fibers and sealing in the interior in order to provide a rigid, durable resinous load bearing shell at the exterior of the body, the interior of the body of inorganic fibrous material being unimpregnated and providing high thermal insulating properties to the member, the layer of resin affixed and sealed to the protruding portions of the frame member to cooperate therewith in forming a strong, rigid closure member, the impregnating layer of resin having a relatively rough surface, and at least one additional coating of cured, hardened organic resin applied over the entire surface of and bonded to the impregnating layer of resin, the additional coating having a smooth surface and bringing the closure member to desired shape, size and surface finish.

7. The closure member of claim 6 wherein the frame member is formed of metal parts united in the general shape of an A, the legs of the A projecting beyond the surface of the body of fibrous material are formed and arranged to function as hinge parts.

8. The closure of claim 7, wherein the part of the frame forming the peak of the A is provided with latch means.

9. A unitary, thermally insulating closure member, comprising a body of inorganic fibrous material with a small amount of a binder uniting the fibers into a firm body having thermally insulating properties, the body of fibrous material and binder being formed closely to the shape of the member, the density of the formed body being from 1.5 to 12 pounds per cubic foot, a relatively rigid, solid frame member disposed within the formed body of fibrous material with only a small part of the portions of the frame member projecting beyond the surface of the formed body, the projecting portions of the frame member being provided with hinging means, the entire exposed surface of the formed body of fibrous material, except for the projecting portions of the frame member, being impregnated to a depth of the order of 0.125 inch, but not substantially exceeding 0.25 inch, with a layer of hardened, cured organic resin adhering to the fibers and sealing in the interior to provide a rigid, durable resinous load bearing shell at the exterior of the body, the interior of the body of inorganic fibrous material being unimpregnated and providing high thermal insulating properties to the member, the layer of resin sealing the protruding portions of the frame member to cooperate therewith in forming a strong, rigid closure member sealed from the exterior, the impregnating layer of resin having a relatively rough surface, and at least two additional coatings of cured, hardened organic resin applied over and bonded to the impregnating layer of resin, one coating being a primer coating and the outermost being a finish coating having a smooth surrace, and the coatings bringing the member to desired shape, size and surface finish.

10. The closure member of claim 9, wherein the frame member comprises metal parts united in the general form of an A, the legs of the A being attached to a metal rod whose ends project beyond the surface of the body of fibrous material, the rod cooperating with the portion forming the legs of the A for hinging movement.

11. A unitary, thermally insulating closure member, comprising a body of inorganic fibrous material and a small amount of a binder uniting the fibers into a firm body having thermally insulating properties, the body of fibrous material and binder being formed closely to the shape of the member, the density of the formed body being from 1.5 to 12 pounds per cubic foot, a relatively rigid, solid frame member disposed within the formed body of fibrous material with only a small part of the portions of the frame member extending beyond the surface of the formed body, the extending portions of the frame member being provided with hinging and latching means, the entire exposed surface of the formed body of fibrous material, except for the extending portions of the frame member being impregnated to a depth of the order of 0.125 inch, but not substantially exceeding 0.25 inch, with a layer of hardened, cured organic resin adhering to the fibers and sealing in the interior of the body to provide a rigid, durable resinous load bearing shell at the exterior of the body, the layer of resin attached to and sealed to the extending portions of the frame member to cooperate therewith in forming a strong, rigid closure member, the impregnating layer of resin having a relatively rough surface, a preformed strip of solid material extending about the entire peripheral portion of the member, the strip being disposed exteriorly of the impregnating layer and attached to the frame member, a gasket affixed to the preformed strip, and at least one additional coating of cured, hardened organic resin applied over and bonded to the impregnating layer of resin, the additional coating having a smooth surface and bringing the member to desired shape, size and surface finish.

12. In a unitary, thermally insulating refrigerator cabinet comprising a body of matted fibrous material, the fibers being substantially all inorganic, with a small amount of a binder uniting the fibers into a firm body having thermal insulating properties, the body of fibrous material and binder being formed closely to the desired shape of the refrigerator cabinet and having walls forming a refrigeration compartment with an opening to said refrigeration compartment, and a chamber for receiving a refrigerator unit with openings to enable the refrigerator unit to be installed therein, the density of the formed body of fibrous material being from 1.5 to 12 pounds per cubic foot, a metal frame disposed within the formed body of fibrous material, the metal frame comprising a plurality of vertical supports and braces between the vertical supports, the braces and supports outlining the opening to the refrigeration compartment and for supporting the refrigerator unit thereon, portions of the metal frame projecting to the exterior of the body of fibrous material to provide hinging means for a door closing the opening to the refrigeration compartment and for directly supporting the refrigerator unit, a penetrating layer of an organic resin applied to the entire exterior surface of the formed body, the layer of organic resin being impregnated into the surface of the formed body of fibrous material to a substantial depth of the order of 0.125 inch but not substantially exceeding 0.25 inch, the layer of organic resin being in a cured, hardened state adhering to the fibers and sealing in the interior of the body to provide a rigid, durable load-bearing resinous shell, the resinous layer affixed to and sealing the projecting portions of the frame, the resinous shell having a relatively rough surface, and at least one additional coating of cured, hardened organic resin applied over and bonded to the entire surface of the layer of organic resin, the additional coating of cured, hardened organic resin having a smooth surface and bringing the cabinet to desired shape, size and surface finish, the unimpregnated interior of the body of fibrous material constituting the major volumetric portion of the cabinet walls.

13. In the method of preparing a smooth surfaced, unitary, thermally insulating member, the steps comprising shaping a mass of matted fibrous material treated with a small amount of binder to unite the fibers into a firm mass having thermal insulating properties into a body having substantially the desired form and size of the member desired, impregnating the entire exterior surface of the shaped body of fibrous material with an organic resin to a depth of the order of 0.125 inch, the resin being hardenable by curing, curing the applied resin, some of the fibers protruding through the impregnated resin, removing the protruding fibers, the resulting member having a rough surface and being slightly smaller than the ultimate desired shape and size of member, the cured, hardened resin forming a strong rigid resinous shell with which the fibers are bonded, the unimpregnated portion of the body of fibrous material being the major volumetric portion of the impregnated member, applying to the rough surface of the impregnated member at least one relatively thin coating of curable organic resin, the applied coating being so applied as to produce a much smoother surface, curing the organic resin, rough spots being removed from the cured appled coating if required, applying at least one coating of curable organic finish to the member, and curing the applied organic finish, the resulting finish coated member having the shape and size and the required surface smoothness.

14. In the method of preparing a smooth surfaced, unitary, thermally insulating member, the steps comprising shaping a mass of matted fibrous material treated with a small amount of binder to unite the fibers into a firm mass having thermal insulating properties into a body having substantially the desired form and size of the member desired, impregnating the entire exterior surface of the shaped body of fibrous material with an organic resin to a depth of the order of 0.125 inch, the resin being hardenable by curing, curing the applied resin, the resulting member having a rough surface and being slightly smaller than the ultimate desired shape and size of member, the cured, hardened resin forming a strong rigid resinous shell with which fibers are bonded, the unimpregnated portion of the body of fibrous material being the major volumetric portion of the impregnated member, molding on the impregnated surface of the member a sufficiently thick coating of a curable organic resin under heat and pressure sufficient to cure the coating of organic resin to enable the member to attain the desired shape and size.

15. The process of claim 14, wherein the coating of organic is applied to the rough surface of the impregnated member previous to the placing of the member in a mold.

16. The process of claim 14 wherein the impregnated member is placed in a mold having a cavity corresponding to the desired shape and size of member and a coating resin is introduced to fill the space between the rough impregnated surface and the walls of the mold cavity.

17. The process of claim 14 wherein the impregnated body of fibrous material is placed in a mold and the organic resin cured in the mold, thereby producing a relatively smooth surfaced member.

18. The process of claim 14 wherein there is applied to the molded coating a thin coating of curable resinous finish composition, and the resinous finish composition is cured to provide a selected color and finish on the member.

19. The process of claim 14 wherein the shaped body with the impregnated surface is treated to remove projecting fibers and excessive projections and roughness before the coating is molded thereon.

References Cited in the file of this patent

UNITED STATES PATENTS

| | | |
|---|---|---|
| 120,171 | Scott | Oct. 24, 1871 |
| 752,075 | Kaffer | Feb. 16, 1904 |
| 896,223 | Marshall | Aug. 18, 1908 |
| 1,757,389 | Rikert | May 6, 1930 |
| 1,863,799 | Leotscher | June 21, 1932 |
| 2,335,102 | Bergin et al. | Nov. 23, 1943 |
| 2,428,591 | Slayter | Oct. 7, 1947 |
| 2,484,756 | Snow et al. | Oct. 11, 1949 |
| 2,501,540 | Ryan | Mar. 21, 1950 |
| 2,552,124 | Tallman | May 8, 1951 |
| 2,566,619 | Lyon et al. | Sept. 4, 1951 |
| 2,583,024 | Strobel | Jan. 22, 1952 |